D. G. STAFFORD.
AUTOMATIC CONTROL MECHANISM FOR HOISTING MACHINERY AND THE LIKE.
APPLICATION FILED NOV. 4, 1918.

1,340,301.

Patented May 18, 1920.

2 SHEETS—SHEET 1.

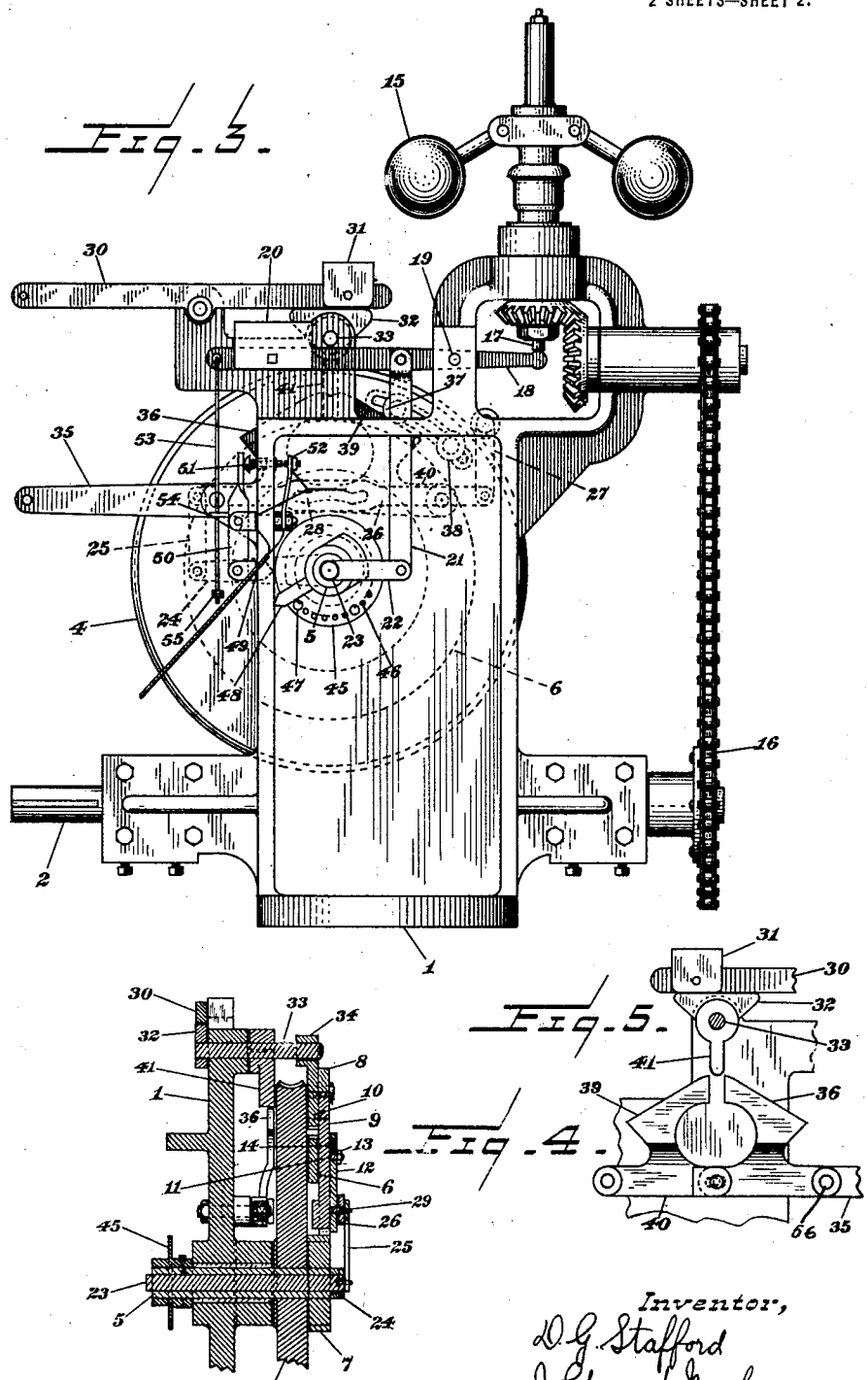

UNITED STATES PATENT OFFICE.

DAVID G. STAFFORD, OF PHOENIX, BRITISH COLUMBIA, CANADA.

AUTOMATIC CONTROL MECHANISM FOR HOISTING MACHINERY AND THE LIKE.

1,340,301.      Specification of Letters Patent.      Patented May 18, 1920.

Application filed November 4, 1918. Serial No. 261,107.

*To all whom it may concern:*

Be it known that I, DAVID G. STAFFORD, of Phoenix, in the Province of British Columbia, Dominion of Canada, have invented certain new and useful Improvements in Automatic Control Mechanism for Hoisting Machinery and the like, of which the following is a specification.

The object of the present invention is to devise means for use with hoisting machinery or other mechanism to automatically control the rate of operation, to automatically slow down the mechanism at predetermined positions of any traveling part, to automatically cut off the power if the operator continues to operate the mechanism in the same direction as previously after a predetermined terminus has been reached, to give warning to the engineer if the predetermined speed is exceeded at any time, and to give warning if any predetermined point of its travel has been reached by a traveling part.

Figure 1:
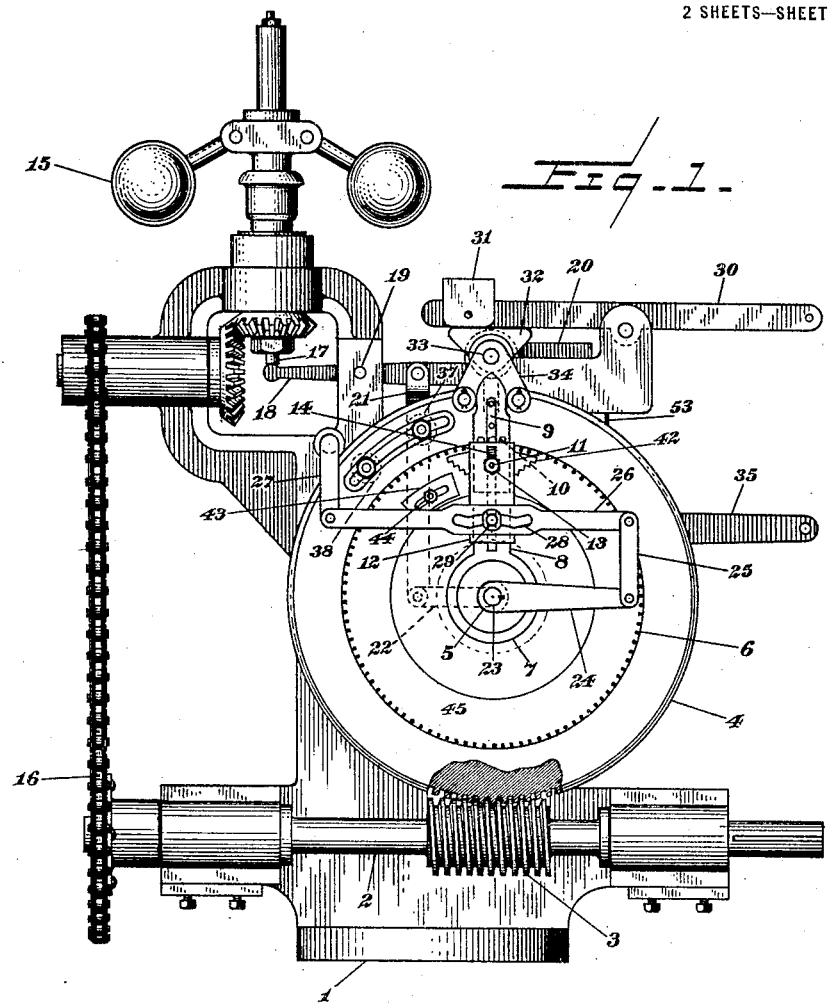
Figure 2:
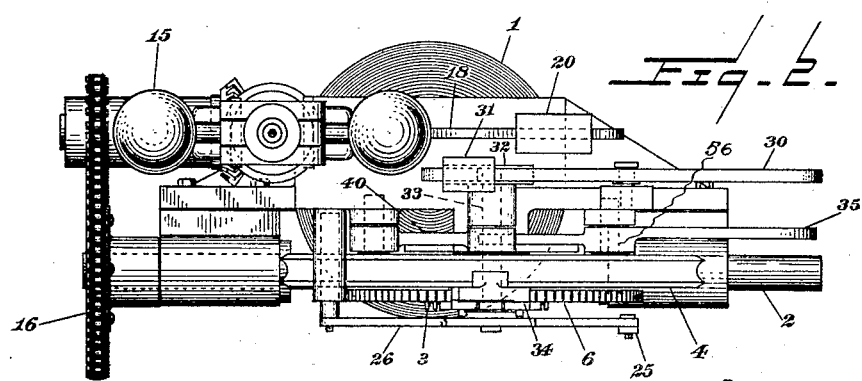

I attain my object by means of the constructions hereinafter described and illustrated in the accompanying drawings in which Figure 1 is a front elevation of my improved device;

Fig. 2 a plan view of the same;

Fig. 3 a rear elevation of the same;

Fig. 4 a longitudinal section of the governor controlled slides; and

Fig. 5 a detail in front elevation of the levers engageable by rollers on the rotary disk of the device to actuate the brake mechanism.

In the drawings like numerals of reference indicate corresponding parts in the different figures.

1 is a frame suitably shaped to support the different parts. On this frame is journaled a worm shaft 2 carrying the worm 3 which meshes with the worm wheel 4 journaled on the frame by means of a hollow shaft 5. To this worm wheel is secured an annular rack 6. On the shaft 5 is journaled a slip ring 7 which carries a slotted arm 8. In the slot of the arm 8 a slide 9 is movable, which slide carries the toothed block 10 adapted to engage the rack 6. This slide has a pin 11 projecting therefrom, which pin passes through a slot in the slide 12, which embraces the arm 8. A nut 13 threaded on the end of the pin 11 serves to hold the parts securely in position.

Between the end of the slot in the slide 12 and the pin 11 is located a coil spring 14. If the slide 12 be moved toward the shaft 5, the slide 9 will be moved in the same direction by the pressure of the spring 14 on the pin 11. If the teeth of the block 10 are not in a position to engage the rack, the coil spring would be compressed and will operate to engage the toothed block with the rack the moment the teeth of the two are in position to engage. The purpose of the engagement of the toothed block with the rack is to cause the arm 8 to rotate with the worm wheel 4 to actuate the control devices under certain contingencies hereinafter referred to.

The slide 12 is actuated from a centrifugal governor 15 driven by suitable gearing 16 from the worm shaft 2, which is driven by the mechanism to be controlled. The plunger 17 of the governor engages a lever 18 fulcrumed at 19, and provided with a weight 20 tending to operate it in the reverse direction to the governor. This lever 18 is connected by a pivoted link 21 with an arm 22 secured to a spindle 23 extending through the hollow shaft 5. To the other end of the spindle is secured the arm 24, which is connected by means of the pivoted link 25 with the lever 26, which is fulcrumed on the link 27 pivoted on the frame. In the lever 26 is formed a slot 28, through which passes the pin 29 secured to the slide 12. An increase in the speed of rotation of the governor will thus actuate the slide 12 toward the shaft 5 through the lever and rock arm system described, thus effecting the engagement of the toothed block 10 with the rack 6 as hereinbefore described.

Pivoted on the frame is a control lever 30. In practice this lever will usually be employed to actuate a switch, throttle valve, or other means of cutting off the power by which the control mechanism is driven. A weight 31 tends to maintain this lever in normal position. A rockable lever trip 32 is secured to a rock shaft 33 journaled on the frame to which rock shaft is also secured the yoke-shaped rocker 34 which embraces the end of the arm 8. Preferably each end of the rocker is provided with an anti-friction roller and the sides of the end of the arm 8 are preferably of the ogee shape shown to facilitate their actuation of the rocker by their engagement with the rollers thereon. At any time therefore that the control mechanism runs at a higher rate of speed than that determined upon, the centrifugal governor will cause the toothed block 10 to engage the rack 6 and thus actuate the control lever to shut off the power and stop the controlled apparatus.

There is also a second control lever 35 provided which in practice will be employed to partially cut off the power operating the control mechanism or to actuate brakes to control its rate of operation or both. This lever is pivoted at 56 on the frame and is provided at its inner end with a cam surface 36, which lies in the path of a roller or other projection 37, preferably adjustably secured to the worm wheel 4 by having its spindle clamped in an arc-shaped slot formed in the wheel. This roller will usually be so positioned that it engages and presses down the cam surface and thus actuates the control lever when the worm wheel has just about completed one revolution, which corresponds to the extreme limit of operation of the control mechanism in one direction. As similar speed control is needed when the control mechanism approaches its limit of travel in the opposite direction, a second roller 38 is provided also adjustably secured in the slot in the worm wheel and adapted to engage the cam surface 39 of the operating lever 40 fulcrumed on the frame and suitably engaging the control lever 35 so as to actuate the same in the same direction as when the latter is directly engaged by the roller 37. (See Fig. 4.)

As the lever 35 as a rule will only control the speed of the mechanism, but will not stop it, it is desirable that means be provided whereby the rollers 37 and 38 may in addition to controlling the rate of movement of the control mechanism at the end of its movement in either direction may also effect the cutting off of the power from such mechanism in the event of the operator starting the mechanism in the wrong direction after its limit of travel has been reached or of overrunning the mechanism in either direction.

For this purpose I secure a trip 41 to the rock shaft 33 in such a position as to be engaged by either of the rollers 37 or 38 according to the direction of motion of the worm wheel, after the said rollers have reached the end of the cam surfaces 36 or 39 as the case may be. This trip will actuate the rock shaft to operate the control lever 30. As an additional precaution in case the control mechanism approaches the end of its movement in either direction at too high a rate of speed, I provide the following direct means for actuating the arm 8 to actuate the control lever 30 to cut off the power. At each side of the slide 12 I form a lug 42 with stepped outer end, and to the rack 6 I secure a block 43. This block is preferably provided with a bolt and slot connection 44 with the rack so that it may be adjusted as to position circumferentially of the rack.

If the control mechanism is moving slowly at the end of its travel, the toothed lugs 42, being connected to a part controlled by the governor, are in their outward position and clear of the block 43. If, however, the speed is high the ends of the block will be in the path of the block 43 and will be struck thereby. The arm 8 will thus be given a driving engagement with the annular cam and the control lever 30 will be operated to cut off the power.

Several steps are provided so that if the speed of the mechanism be excessive the lugs will be the sooner engaged as they will be projected farther across the path of the block 43 than when the rate of operation of the control mechanism is less. The power will thus be cut off at progressively earlier times according to the speed of the mechanism, thus giving proper time for the stoppage of the mechanism at all rates of speed.

The mode of operation of the device is substantially as follows. At all times the rate of operation of the mechanism is controlled and when the operator attempts to operate at a greater speed than that predetermined, the toothed block 10 is engaged with the rack 6 and the mechanism stopped as hereinbefore described. At the end of the travel of the control mechanism in any direction, its speed is automatically reduced by the engagement of one or other of the rollers 37 or 38 with the cam surfaces 36 or 39, which causes the operation of the control lever 35. The actual stoppage of the mechanism at the end of its travel in either direction is insured by the operation of the block 43 engaging one of the lugs 42 or by the engagement of one of the rollers 37 or 38 with the trip 41. Rollers similar to 37 and 38 may be secured to the worm wheel in any desired position to engage the cam surfaces 36 or 39 at any desired point in the travel of the control mechanism, so that if the control mechanism be operating a cage or skip, the mechanism may be slowed down at any intermediate point of travel of the hoist or skip.

It is desirable to give visual or audible warning of the movement of the mechanism so that the fact that the speed has been excessive may be indicated to the operator of the cage or skip or its approach to its limit of movement in either direction indicated and the operator thus warned that the speed of the engine must be reduced.

To the hollow shaft 5 at the back of the apparatus is secured a collar 45 provided with a plurality of holes 46 into which may be inserted pins 47. These pins lie in the path of the arm 48 journaled on the shaft 5. The end of this arm is beveled from either side to engage the beveled end of the slide 49 slidable in the frame and pivotally connected with a lever 50 fulcrumed on the frame and adapted at its other end to engage the spring actuated plunger 51 which forms one contact of an electric circuit and is adapted to engage the second spring contact 52. An electric circuit may thus be completed to actuate a suitable signal. In order that the operation of the control lever 30 may be indicated to the operator, I connect to the lever 18, the movement of which determines the operation of the lever 30, a rod 53 which passes through an arm 54 extending out from the lever 50 and has a nut 55 screwed on its end. A movement of the lever 18 to cause the operation of the lever 50 will lift the rod 53 and cause the nut 55 to rock the lever 50 to complete the electric circuit just described. This nut is adjusted so that a signal is given just as the teeth on the block 10 are about to engage the notches of the rack 6.

From the above description it will be seen that any machinery may be stopped by my device when it rises above a certain predetermined speed and that with any hoisting machinery its speed may be regulated so that when a hoist or skip is approaching any landing or the terminus of its travel it will be going at what is determined to be a safe speed. It will also be seen that by means of it a warning is given if the speed of the engine is too great or the hoist is approaching either limit of its travel and if any predetermined limit is exceeded brakes will be applied or the mechanism otherwise controlled and ultimately the power automatically shut off. It will also be seen that observation of the position of the worm wheel enables the operator to ascertain the position of the hoist or skip at any time. So also the position of the slide 12 indicates to the operator at any time the speed at which the hoist or skip is traveling.

It will be noted that the slot 28 has its central portion formed as an arc having its center at the center of the shaft 5, while its ends incline outwardly. The result is that after the slide 12 and block 10 have been drawn down and held down sufficiently long for the arm 8 to actuate the control lever 30, the slide 12 is pushed out again and the block 10 disengaged and the arm 8 thus allowed to return to its normal position.

What I claim as my invention is:—

1. In automatic control apparatus of the class described, the combination of a journaled disk; means for driving said disk from the mechanism to be controlled; a circular rack on said disk; a rock arm journaled concentric with said disk and rack; a toothed block slidable longitudinally of said arm and adapted to engage the rack; a governor adapted to be driven from the mechanism to be controlled; connections whereby the governor may slide the toothed block; a control actuating device; a yoke-shaped rocker adapted to operate the control actuating device and embracing the outer end of the rocker arm whereby the rock arm when moved actuates the control actuating device.

2. In automatic control apparatus of the class described, the combination of a journaled disk; means for driving said disk from the mechanism to be controlled; a circular rack on said disk; a rock arm journaled concentric with said disk and rack; a toothed block slidable longitudinally of said arm and adapted to engage the rack; a governor adapted to be driven from the mechanism to be controlled; connections whereby the governor may slide the toothed block; a control actuating device; means whereby the rock arm when moved actuates the control actuating device; and a projection carried by the disk adapted to engage either side of the rock arm to actuate the control actuating device.

3. In automatic control apparatus of the class described, the combination of a journaled disk; means for driving said disk from the mechanism to be controlled; a device for actuating speed control mechanism; a projection carried by the disk adapted to actuate the device; and a second control actuating device for actuating stopping mechanism actuable by the said projection after the operation of the first device.

4. In automatic control apparatus of the class described, the combination of a journaled disk; means for driving said disk from the mechanism to be controlled; a control lever provided with a cam surface engageable by said projection to rock the lever; an operating lever fulcrumed on a stationary part and engaging the control lever, said operating lever being provided with a cam surface engageable by the said projection, when the direction of rotation of the disk is reversed to rock the control lever in the same direction as by direct engagement of the projection and cam lever.

5. In automatic control apparatus of the class described, the combination of a journaled disk; means for driving said disk from the mechanism to be controlled; a control lever provided with a cam surface engageable by said projection to rock the lever; an operating lever fulcrumed on a stationary part and engaging the control lever, said operating lever being provided with a cam surface engageable by the said projection, when the direction of rotation of the disk is reversed, to rock the control lever in the same direction as by direct engagement of the projection and cam lever; a second control lever; and a trip adapted to actuate the said lever, the aforesaid projection being adapted to engage said trip from either side to actuate the said lever after the actuation of the first mentioned control lever.

6. In automatic control apparatus of the class described, the combination of a journaled disk; means for driving said disk from the mechanism to be controlled; a circular rack on said disk; a rock arm journaled concentric with said disk and rack; a toothed block slidable longitudinally of said arm and adapted to engage the rack; a governor adapted to be driven from the mechanism to be controlled; connections whereby the governor may slide the toothed block; a control actuating device; and means whereby the rock arm when moved actuates the control actuating device; a lug with a stepped end connected to the slidable toothed block; and a block secured to the disk in a position to engage one of the steps on said lug if the speed of the mechanism is not sufficiently reduced.

7. In automatic control apparatus of the class described, the combination of a journaled disk; means for driving said disk from the mechanism to be controlled; a control-actuating device; a projection carried by the disk adapted to actuate the control actuating device; a disk rotating with the disk aforesaid; a pin adapted to be secured to the disk in a plurality of positions; an arm journaled concentric with the disks; a slide adapted to be moved by the contact of either side of said arm; a lever fulcrumed on the frame of the apparatus and pivotally connected to the slide; and spring electric contacts actuable by the said lever.

8. In automatic control apparatus of the class described, the combination of a journaled disk; means for driving said disk from the mechanism to be controlled; a circular rack on said disk; a rock arm journaled concentric with said disk and rack; a toothed block slidable longitudinally of said arm, and adapted to engage the rack; a governor adapted to be driven from the mechanism to be controlled; connections whereby the governor may slide the toothed block; a control actuating device; means whereby the rock arm when moved actuates the control actuating device; an arm journaled concentric with the disks; a slide adapted to be moved by the contact of either side of said arm; a lever fulcrumed on the frame of the apparatus and pivotally connected to the slide; and spring electric contacts actuable by the said lever; a part movable by the governor aforesaid provided with an adjustable projection adapted to engage and rock the aforesaid lever when the governor moves under the influence of excessive speed of the mechanism to be controlled.

9. In automatic control apparatus of the class described, the combination of a journaled disk; means for driving said disk from the mechanism to be controlled; a circular rack on said disk; a rock arm journaled concentric with said disk and rack; a toothed block slidable longitudinally of said arm and adapted to engage the rack; a governor adapted to be driven from the mechanism to be controlled; connections whereby the governor may slide the toothed block including a shaft concentric with the journaled disk, an arm secured to the shaft adjacent the disk, a link pivoted at one end to the arm, a longitudinally slotted lever to which the other end of the link is pivoted, a pivoted link forming a fulcrum for the lever, and a pin on the sliding block fitting in the slot of the said lever.

Signed at Phoenix, B. C., Canada, this 9th day of October, 1918.

DAVID G. STAFFORD.

Witnesses:
S. A. SWANSON,
R. K. McCAMMON.